Dec. 19, 1961   R. M. MacINTYRE   3,014,169
ENERGY TRANSFER CIRCUITS
Filed Aug. 14, 1958   2 Sheets-Sheet 1

ROBERT M. MacINTYRE
INVENTOR.

BY

ATTORNEY

Dec. 19, 1961    R. M. MacINTYRE    3,014,169
ENERGY TRANSFER CIRCUITS
Filed Aug. 14, 1958    2 Sheets-Sheet 2
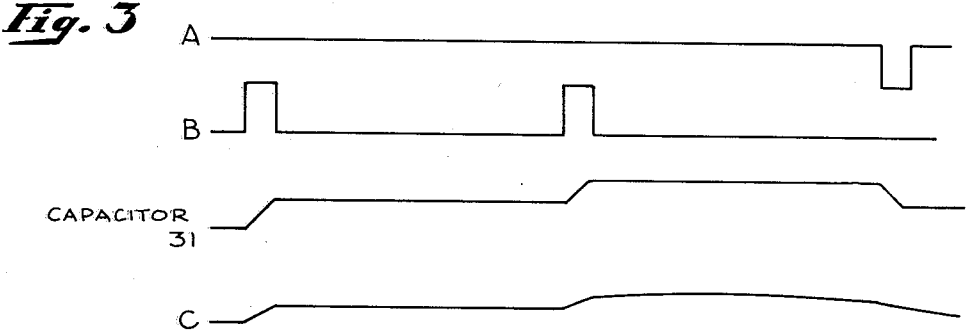
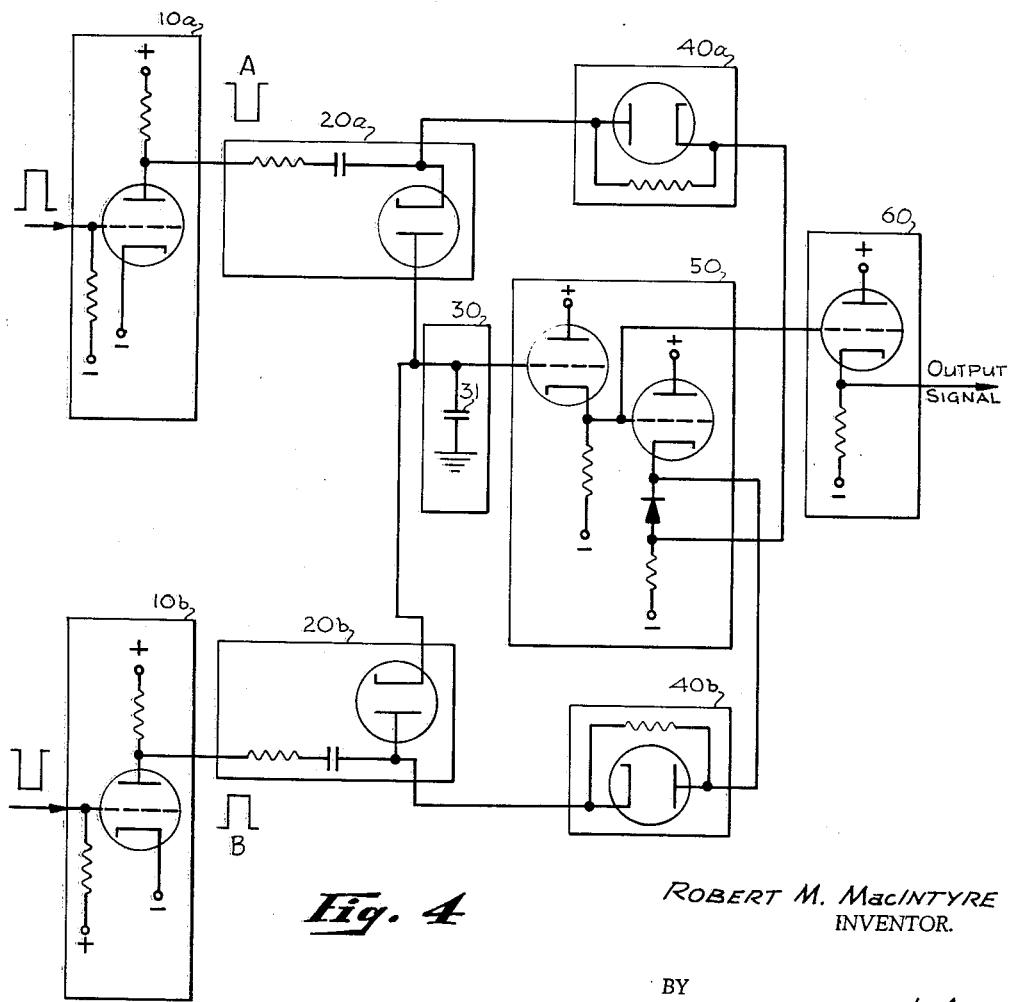
ROBERT M. MacINTYRE
INVENTOR.
BY
*Lester S. Heath*
ATTORNEY United States Patent Office 3,014,169
Patented Dec. 19, 1961

3,014,169
ENERGY TRANSFER CIRCUITS
Robert M. MacIntyre, Gardena, Calif., assignor, by mesne assignments, to Thompson Ramo Wooldridge Inc., Cleveland, Ohio, a corporation of Ohio
Filed Aug. 14, 1958, Ser. No. 755,024
17 Claims. (Cl. 320—1)

This invention relates to energy transfer circuits, and more particularly, to circuits for charging or discharging a storage element such as a capacitor in response to charging and discharging control pulses.

In the electronic computer field and certain other related electronic arts, it is often desired to store an electrical quantity for some selected period of time. Various techniques have been devised in the prior art for accomplishing this by charging and discharging a storage capacitor. The usual requirements call for charging and discharging circuits which have relatively high energy transfer rates when the change of charge is being effected, and which place a minimum load on the storage capacitor during quiescent times.

It follows from elementary circuit theory that, as a storage capacitor tends to approach the potential of the charging or discharging source, the rate of current flow and hence the rate of charge change diminishes. Stated otherwise, the rate of charge or discharge is dependent upon the difference between the instantaneous capacitor potential and the source or reference potential during any prescribed interval of time. Therefore a circuit for charging or discharging capacitor is inherently non-linear.

The non-linear charging rate of the prior art circuits causes difficulty in many control applications where the signal retained in the storage capacitor represents an analogue quantity.

In particular, it is undesirable in a digital-to-analogue converter system where a stored analogue output value is changed from time to time. If the rate of change of the stored analogue signal is not constant, the problem of determining the control characteristic of the system becomes very complicated, and it becomes necessary to allow an amount of time for changing the amplitude of the analogue control signal which is equal to the maximum time required. In particular, this means that the charging or discharging time for the storage capacitor must be assumed to be equal to the time required to change the capacitor voltage amplitude, which is directly representative of stored charge, by a desired increment with the lowest value of available charging potential. Thus in operating the prior art circuits, much more time must be allowed for charging than is ordinarily required at nominal signal levels and the overall rate of circuit operation is thereby substantially reduced.

The present invention obviates the above and other disadvantages of the prior art by providing a circuit wherein the charging rate for a storage element is independent of the amplitude of the signal in the storage element. This is accomplished, according to the invention, by means of a novel feedback or charge restoring arrangement wherein the electrical quantity in the storage element is controlled so that, within a wide latitude of linear operation, the same amount of charge or energy is transferred to the storage element during each period of time, regardless of the magnitude of the electrical quantity therein. This assumes, of course, that the operating limits are not exceeded.

In more particular terms, the invention contemplates the use of a charge-retaining capacitor for supplying charge to, or receiving charge from, the storage capacitor during discrete time intervals (pulse periods). In one arrangement, a feedback or charge restoring circuit is employed and includes a diode coupled between an output circuit associated with a storage capacitor and the charge-time retaining capacitor. The arrangement is such that a charge equal to the previously transferred charge is returned to the charge-retaining capacitor between charging or discharging pulse periods so that the energy level at the output point of the charge-retaining capacitor is always the same amount above the storage capacitor level. In a sense, the invention may be compared to a water reservoir filling system which is filled by a pressure pump system at its bottom; wherein the pressure of the said pump system is raised each time the reservoir level is raised and decreased each time the reservoir level is decreased to adjust for the inherent back pressure resulting from the level of water stored in the reservoir.

Accordingly, it is an object of the present invention to provide an improved energy transfer circuit wherein the transfer rate is independent of the magnitude of the energy already transferred to the receiving or storage element.

Another object is to provide a charging or discharging circuit for a storage capacitor wherein the amount of charge which may be transferred to or from the storage capacitor during any time interval is maintained substantially constant for all amplitudes of the charge in the storage capacitor, within prescribed limits for the parameters of the elements selected.

A further object is to provide an energy transfer circuit which may be utilized in a control system to provide a linear response which is independent of the level of the output signals which are produced.

A specific object of the invention is to provide a circuit for charging and discharging a storage capacitor in response to charge and discharge control pulses, respectively, the circuit including means for continuously adjusting the input energy levels so that they differ from the energy level in the storage capacitor by a fixed amount.

The novel features which are believed to be characteristic of the invention, both as to its organization and method of operation, together with further objects and advantages thereof, will be better understood from the following description considered in connection with the accompanying drawings, in which several embodiments are illustrated by way of example. It is to be expressly understood, however, that the drawings are for the purpose of illustration and description only and are not intended as a definition of the limits of the invention.

FIG. 3 is a composite set of waveform diagrams illustrating the operation of the embodiment of FIG. 2; and FIG. 4 is a schematic diagram of another species of the invention utilizing vacuum tubes.

Figure 1:
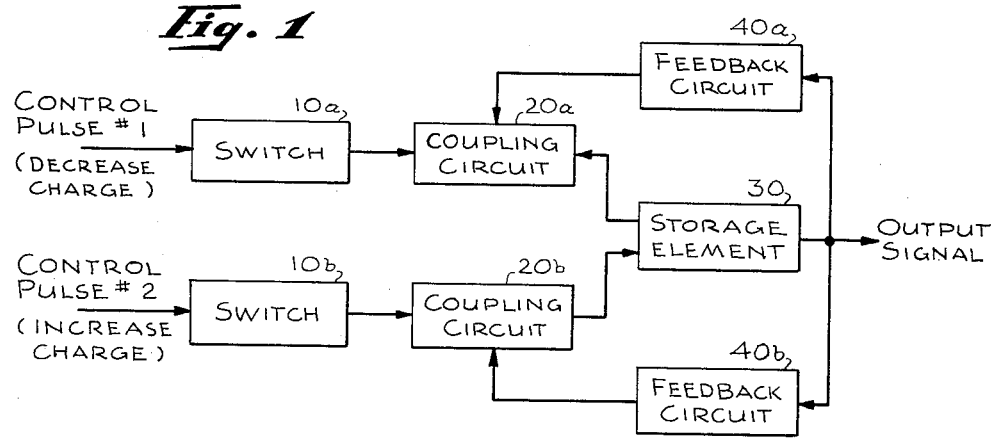
FIG. 1 is a block diagram indicating the general form of an embodiment according to the invention for increasing or decreasing the level of signal in a storage element.

Reference is now made to FIG. 1 wherein a block diagram of one form of the invention is shown. As indicated, control pulses are applied to switches $10a$ and $10b$, respectively. Each of switches 10 is connected to a coupling circuit 20, the letters "$a$" and "$b$" being used to indicate the association. It will be assumed, as an example, that coupling circuit $20a$ is utilized to decrease the value of the signal in a storage element 30 and that coupling circuit $20b$ is utilized to increase the value of the signal in storage element 30. The output signal of storage element 30 is applied to feedback circuits 40, circuit $40a$ being associated with coupling circuit $20a$ for decreasing the energy level therein to an amount at a predetermined level below the storage element energy level so that the same amount of energy may be received from storage element 30 during each discharging or energy decreasing cycle; and coupling circuit 20b is controlled by feedback or charge restoring circuit 40b to increase the energy level thereof to provide a substantially constant level above that of storage element 30 so that the same amount of energy may be transferred to storage element 30 during each charging or signal increasing cycle.

It will be understood, of course, that the invention may be practiced separately with either a charging subcombination or a discharging subcombination. This means, in particular, that the circuit components with the letter "a" may be employed separately for discharging storage element 30, or those components with the letter "b" may be utilized separately for charging element 30.

Figure 2:
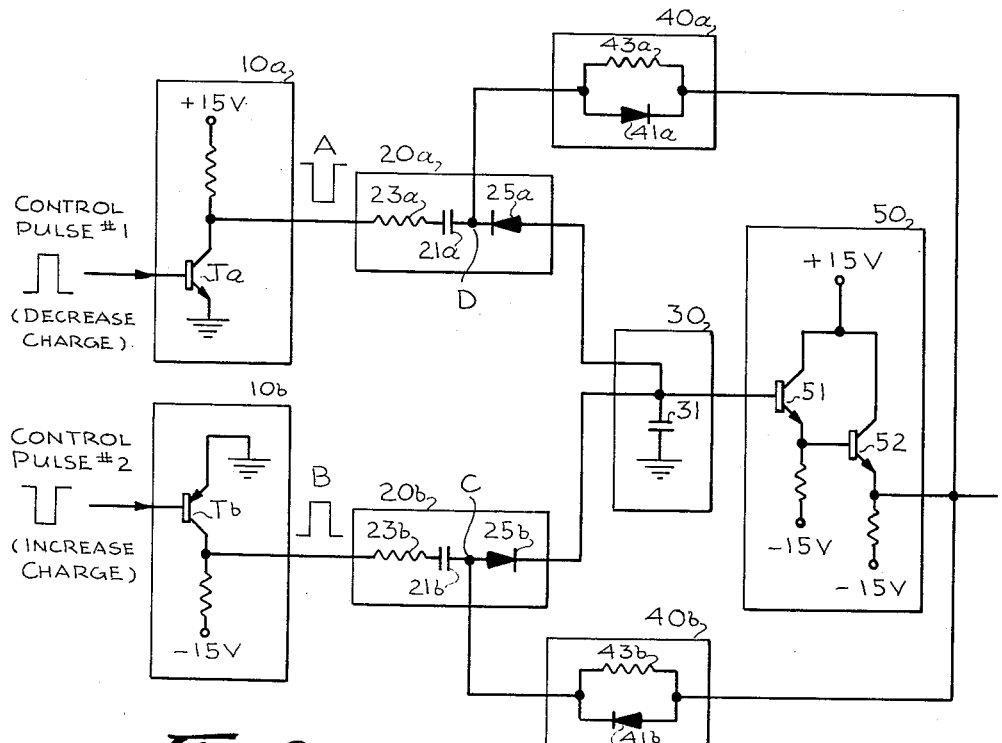
FIG. 2 is a schematic diagram of a circuit for charging or discharging a storage capacitor according to the invention.

The particular contribution of the invention can best be described by referring to a particular schematic such as is shown in FIG. 2. In this embodiment, switches 10 of FIG. 1 comprise transistors, transistor $T_a$ of switch 10a being an NPN type and actuated in response to a positive pulse to provide a negative output pulse referenced as A. Transistor $T_b$ of switch 10b is a PNP type actuable in response to a negative input pulse to produce a positive output pulse referenced as B.

Pulses A and B are applied respectively to coupling circuits 20a and 20b, each of which includes a charge-retaining capacitor 21. It will be shown that the use of the charge-retaining capacitors in coupling circuits 20 permits raising the signal energy in storage capacitor 31 of storage element 30. Capacitors 21 are each associated with series impedances 23, illustrated to be resistors. Impedances 23a and 23b together with capacitors 21a and 21b determine the time constants of circuits 20a and 20b.

In practice, the time constant of circuit 20 is made to be two to five times the pulse period so that small changes in the values of resistors 23 or capacitors 21 do not materially affect the rate of charge transfer. Depending upon the actual value of these time constant components, the current flow during charge transfer may be more or less exponential in character, however the operation of the invention is not significantly related to this fact. It is an important feature of the invention, however, that the shape of this exponential current during the pulse interval is not dependent upon the value of the charge stored in capacitor 31, within the range of allowable output levels.

Coupling circuits 20 each include isolating diodes 25, each being connected to pass charge in the proper direction; that is, diode 25a is arranged to discharge capacitor 31 and diode 25b is arranged to charge capacitor 31. The charging and discharging is performed in response to signals B and A, respectively, since otherwise diodes 25 are in a substantially nonconducting state. Diodes 25 are substantially nonconducting since output circuit 50, acting through feedback circuits 40a and 40b, tends to keep diodes 25a and 25b substantially zero biased (assuming zero base-emitter drop for transistors 51 and 52).

The output signal of storage capacitor 31 is applied to output circuit 50 which is shown as comprising transistors 51 and 52 arranged as conventional emitter followers. The output signal of transistor 52 provides inputs to feedback circuits 40, each of which is shown as including a diode 41 in parallel with an impedance 43 illustrated as a resistor. Diodes 41 are arranged so that when diodes 25 are substantially nonconducting, as described above, the associated charge-retaining capacitor has its energy level changed in accordance with the output signal derived from capacitor 31. In particular, charge-retaining capacitor 21a is discharged through diode 41a (when transistor $T_a$ is cut off) to a level where the signal at the junction between capacitor 21a and diode 25a is substantially equal to the level of the signal on capacitor 31.

In a similar manner when transistor $T_b$ is cut off, charge-retaining capacitor 21b is charged through diode 41b to a level where the signal at the junction with diode 25b is substantially equal to the level of storage capacitor 31. If the output voltage of output circuit 50 is decreased by the action of circuits 10a, 20a and 30, the voltage at the junction of capacitor 21b and diode 25b is decreased by means of impedance 43b. Likewise, if the output voltage of output circuit 50 is increased by the action of circuits 10b, 20b and 30, the voltage at the junction of capacitor 21a and diode 25a is increased by means of impedance 43a.

Moreover the time constant formed by the collector resistance of each transistor and its associated resistors 23 and 43 and capacitor 21, is short enough to permit the above-named junction points to follow the maximum average change of circuit 50 output voltage. In other words, diode 41 restores the charge on capacitor 21 after the charge has been transferred to capacitor 31, but resistor 43 permits relatively slower charging of capacitor 21 to keep the voltage across diode 25 equal to zero.

The operation of the embodiment of FIG. 2 will be described with reference to the waveforms in FIG. 3. Waveforms A and B correspond to the input pulses A and B shown in FIG. 2. In addition, the signal which is developed across capacitor 31 in an illustrative operation is shown and the signal at junction C in circuit 20b is shown to indicate the manner in which the energy level of the circuit is charged in accordance with the level of capacitor 31.

When a charge control pulse B is derived through transistor $T_b$, capacitor 31 is caused to charge by the transfer of energy from circuit 20b to this capacitor. If diodes 25 exhibited no forward drop, there would be no positive pulse at C. In the actual case, the voltage at point C rises only an amount equal to the forward drop of diode 25b, assuming that the initial voltage across diode 25b was zero. Base-emitter drops of transistors 51 and 52 may be considered to be zero for the purposes of this practical discussion.

At the end of the charging pulse period the level of capacitor 31 remains fixed since coupling diode 25b becomes back biased preventing further current passage thereto. It may be noted that since the voltage at capacitor 31 increases slightly during the charge time and the voltage across capacitor 21b decreases slightly, diode 25b will be slightly back-biased after the end of pulse B. The charge removed from capacitor 21b is replaced then at a rate governed by the time constant determined by the collector resistor of $T_b$, resistor 23b and capacitor 21b, the final result being a zero voltage across diode 25b (again assuming perfect semiconductors). At the end of the charging pulse period, feedback circuit 40b becomes operative to raise the level at point C in circuit 20b in accordance with the level of capacitor 31. Thus the level of waveform C approaches the same level as that in storage capacitor 31. There may be a slight difference due to a less than unity gain through stage 50 and to a voltage drop across diode 41b.

When the next charging pulse B is received, the level at point C is again raised by the precise amount of the charging pulse, and, therefore, the amount of energy which is available to charge capacitor 31 is the same as in the previous charging cycle. This means that capacitor 31 is charged again during the pulse period B at the same rate as it was previously charged. At the end of this second charging interval, the previous charge restoring cycle is repeated during which time capacitor 21b again receives the energy to bring point C to the approximate level of storage capacitor 31.

A discharging pulse A has the opposite effect through circuit 20a. Yet in this case, the negative pulse A occurs at point D in circuit 20a causing the discharging of capacitor 31. At the end of this period, energy is withdrawn from charge-retaining capacitor 21b to bring the level of the point C down to correspond to the reduced level of the signal in capacitor 31.

From the foregoing description, it should now be apparent that the present invention provides an improved energy transfer circuit wherein the transfer rate is independent of the magnitude of the energy already transferred to the receiving or storage element. In the example just given, each change in the amplitude of the signal stored in capacitor 31 is sensed and translated to a corresponding change in charge-retaining capacitor 21 so that the energy available for further charge changes remains constant and consequently the rate of energy transfer is constant.

It will be understood, of course, that many variations in the basic embodiment of the invention are possible. For example, the input switches need not be transistors, as in FIG. 2, but may be vacuum tubes, as indicated in FIG. 4. In a similar manner the various diodes which are employed may be thermionic diodes rather than semiconductor diodes. This variation is also indicated in FIG. 4. In addition, the impedance in circuits 20 need not necessarily be a resistor in all cases since conceivably an A.C. operation may permit the use of an inductor.

Many other variations are also possible in the type of output circuit which is employed. In FIG. 4 cathode followers are shown in circuit 50 corresponding to the emitter followers of circuit 50 shown in FIG. 2; and, in addition, a separate output stage 60 is shown which is isolated from the feedback circuit 40. The advantage of this arrangement is that it isolates the operation of the feedback circuit from any utilization circuits which are connected at the output of stage 60. The particular circuit of FIG. 4 has been employed in connection with a digital-to-analogue converter. Briefly, storage element 30 is employed to store an analogue value corresponding to digital information decoded in separate circuitry which provided the charge and discharge control pulses to the present invention. Still another separate circuit senses the voltage of capacitor 31 through the separate output stage 60. Since feedback circuits 40 draw substantial amounts of current in the act of replenishing the charge on capacitors 21, the feedback circuits tend to load the output of circuit 50 as shown in FIG. 2. Utilization circuits, if at all sensitive, will be unable to distinguish between a drop in voltage at the output of 50 as caused by the loading of the feedback circuits from an actual analogue change. In a closed loop system where the charge and discharge control pulses are generated as a function of the output signal of the circuit of the present invention, oscillation or hunting is evident. The use of separate output stage 60 eliminates this source of difficulty and thereby enhances the ability of the present invention to perform satisfactorily in a closed loop apparatus.

While a few variations have been shown and pointed out in the discussion herein, it will be understood that the invention is not so limited but is generic to a wide class of circuits for transferring energy to a storage element wherein provision is made to insure that the rate of transfer is independent of the amplitude of the signal in the storage element. Accordingly, the scope of the invention as defined in the appended claims is intended to be commensurate with a large class of circuits including many variations which will be apparent to those skilled in the art.

What is claimed is:

1. In a system for altering the value of an electrical quantity stored in a storage element, the combination comprising: first and second switching means actuable to pass current in response to increase and decrease control pulses, respectively; coupling means for transferring current passed through said first and second switching means to said storage element; and feedback means responsive to said electrical quantity for controlling the transfer of current through said coupling means so that the rate of transfer is substantially independent of the magnitude of said electrical quantity.

2. In a circuit for altering the charge of a storage element at a rate substantially independent of the magnitude of the charge change to be effected, the combination comprising: an input circuit including a first means for adding a predetermined amount of charge to said storage element in response to a charge signal, and a second means for subtracting a predetermined amount of charge from said storage element in response to a discharge signal; and feedback means coupled between said storage element and said input circuit for restoring said predetermined amount of charge to said input circuit after each change of charge of said storage element.

3. In an arrangement for charging or discharging a storage element through an input circuit including a first means which is adapted to pass charging current to said storage element in response to a charge pulse, and a second means which is adapted to draw discharging current from said storage element in response to a discharge pulse, the improvement comprising: a feedback circuit coupled between said storage element and said input circuit for controlling the operation of said input circuit in accordance with the level of the signal in said storage element so that the change rate of charge for said storage element is substantially independent of said level.

4. A device for supplying charge at a constant rate to a storage element, said device comprising: an input circuit actuable in response to a charge-control pulse to supply charge to said element, said input circuit having a time constant substantially longer than the time duration of said charge-control pulse so that the current passage therethrough during the charge-control pulse interval is substantially constant; and a charge restoring circuit coupled between said element and said input circuit for establishing a charge level for said input circuit such that equal amounts of charge are delivered to said element during each charge-control pulse interval, regardless of the level of the signal in said element.

5. A device for changing the charge condition of a storage element during a control pulse period, said device comprising: a switching circuit for passing charge-changing current; a coupling circuit connected between said switching circuit and said storage element, said coupling circuit including a charge-retaining element; and a feedback circuit coupled between said storage element and said coupling circuit, said feedback circuit being arranged to modify the charge condition of said charge-retaining element in accordance with the level of the signal in said storage element so that the rate of charge change is maintained constant for each control pulse period.

6. In a system for changing the charge condition of a storage capacitor wherein an input circuit is arranged to pass current to effect the desired charge change in response to a control signal having a first level during the storage-capacitor charge changing interval and a second level during the charge retaining interval for said storage capacitor, the improvement comprising: a network coupled between said storage capacitor and said input circuit including a unilateral device and a charge-retaining capacitor, said charge-retaining capacitor being arranged to receive current passed through said input circuit and to retain a charge proportional to the amount of current passed, and said unilateral device being arranged to change the charge condition of said charge-retaining capacitor when said control signal is at its second level so that equal amounts of charge are transferred during each period of the first level of said control signal.

7. An arrangement for charging and discharging a storage capacitor comprising: first and second switching circuits for passing charging and discharging current in response to charge and discharge control pulses, respectively; first and second charge-retaining circuits coupling said first and second switching circuits to said storage capacitor, respectively; and first and second charge restoring circuits for charging said first and second charge-retaining circuits, respectively, to levels corresponding to the then present level of the signal in said storage capacitor.

8. The arrangement defined in claim 7 wherein each of said switching circuits includes a transistor arranged to be driven into conduction to supply said charging and discharging current.

9. The arrangement defined in claim 8 wherein said first switching circuit transistor is an NPN transistor arranged to provide a negative current pulse in response to a positive discharging control pulse, and wherein said second switching circuit transistor is a PNP transistor arranged to provide a positive current pulse in response to a negative charging control pulse.

10. The arrangement defined in claim 7 wherein each of said charge-retaining circuits includes a series network of an impedance and a coupling capacitor.

11. The arrangement defined in claim 10 wherein there is further included a diode in each of said charge-retaining circuits to permit the passage of charge from said storage capacitor, in the case of said first charge-retaining circuit, and to said storage capacitor, in the case of said second charge-retaining circuit.

12. The arrangement defined in claim 7 wherein each of said switching circuits includes a vacuum tube arranged to be driven into conduction to supply said charging and discharging current.

13. The arrangement defined in claim 7 wherein said charge-restoring circuits each include a diode connected to permit the restoration of charge therethrough during the intervals between control pulses.

14. The arrangement defined in claim 13 wherein each of said diodes in said charge-restoring circuits is connected in parallel with an impedance.

15. The arrangement defined in claim 7 wherein there is further included a first output stage connected to said capacitor, a feedback circuit coupled between said first output stage and said first and second charge-restoring circuits, and a second output stage isolated from said first output stage.

16. In a circuit for charging and discharging a storage element through an input circuit including a first means adapted to pass charging current to said storage element in response to a charge pulse, and a second means adapted to draw discharging current from said storage element in response to a discharging pulse, said circuit also including at least one feedback circuit deriving a signal from said storage element and applying a signal to said input circuit proportional to the level of charge in said storage element to insure rates of charge and discharge of said storage element which are substantially independent of said level of charge, the improvement comprising: first current amplification means interposed in said feedback circuit between said storage element and said input circuit; and second current amplification means connected to said storage element for providing an external output, thereby avoiding output circuit loading effects due to feedback current drawn by said input circuit.

17. In a circuit for altering the charge of a storage element at a rate substantially independent of the magnitude of the charge change to be effected, said circuit including an input circuit which comprises a first means having a variable initial charge condition for adding a predetermined amount of charge to said storage element in response to a charge control signal, and a second means having a variable initial charge condition for subtracting a predetermined amount of charge from said storage element in response to a discharge control signal, and feedback means coupled between said storage element and input circuit means for establishing said variable initial charge condition in accordance with the level of charge in said storage element, the improvement comprising: output means including an isolation amplifier interposed between said storage element and said feedback means and having substantially no loading effect on said storage element, said isolation amplifier being further adapted to supply current drawn by said feedback means without exhibiting loading effects on any output signal derived from said storage element.

References Cited in the file of this patent

UNITED STATES PATENTS

| | | |
|---|---|---|
| 2,637,010 | Charske | Apr. 28, 1953 |
| 2,813,241 | Smith | Nov. 12, 1957 |
| 2,843,736 | Huntley | July 15, 1958 |
| 2,891,209 | Schalk | June 16, 1959 |

UNITED STATES PATENT OFFICE
CERTIFICATE OF CORRECTION

Patent No. 3,014,169                 December 19, 1961

Robert M. MacIntyre

It is hereby certified that error appears in the above numbered patent requiring correction and that the said Letters Patent should read as corrected below.

Column 1, line 31, after "discharging" insert -- a --; column 5, line 9, for "further" read -- future --; column 8, line 26, for "input circuit means" read -- said input circuit --.

Signed and sealed this 1st day of May 1962.

(SEAL)
Attest:

ERNEST W. SWIDER                 DAVID L. LADD
Attesting Officer                 Commissioner of Patents